J. E. ZIMMERMAN.
COMBINATION COOKING AND HOUSE WATER HEATING RANGE.
APPLICATION FILED AUG. 29, 1918.

1,294,217.

Patented Feb. 11, 1919.
4 SHEETS—SHEET 1.

WITNESSES
Arthur Insch
Geo. L. Beeler

INVENTOR
Joseph E. Zimmerman
BY
ATTORNEYS

J. E. ZIMMERMAN.
COMBINATION COOKING AND HOUSE WATER HEATING RANGE.
APPLICATION FILED AUG. 29, 1918.

1,294,217.

Patented Feb. 11, 1919.
4 SHEETS—SHEET 2.

WITNESSES
Arthur Frisch
Geo. L. Beeler

INVENTOR
Joseph E. Zimmerman
BY
Munn & Co.
ATTORNEYS

J. E. ZIMMERMAN.
COMBINATION COOKING AND HOUSE WATER HEATING RANGE.
APPLICATION FILED AUG. 29, 1918.

1,294,217.

Patented Feb. 11, 1919.
4 SHEETS—SHEET 3.

WITNESSES
Arthur Onisch
Geo. L. Beeler

INVENTOR
Joseph E. Zimmerman
BY
ATTORNEYS

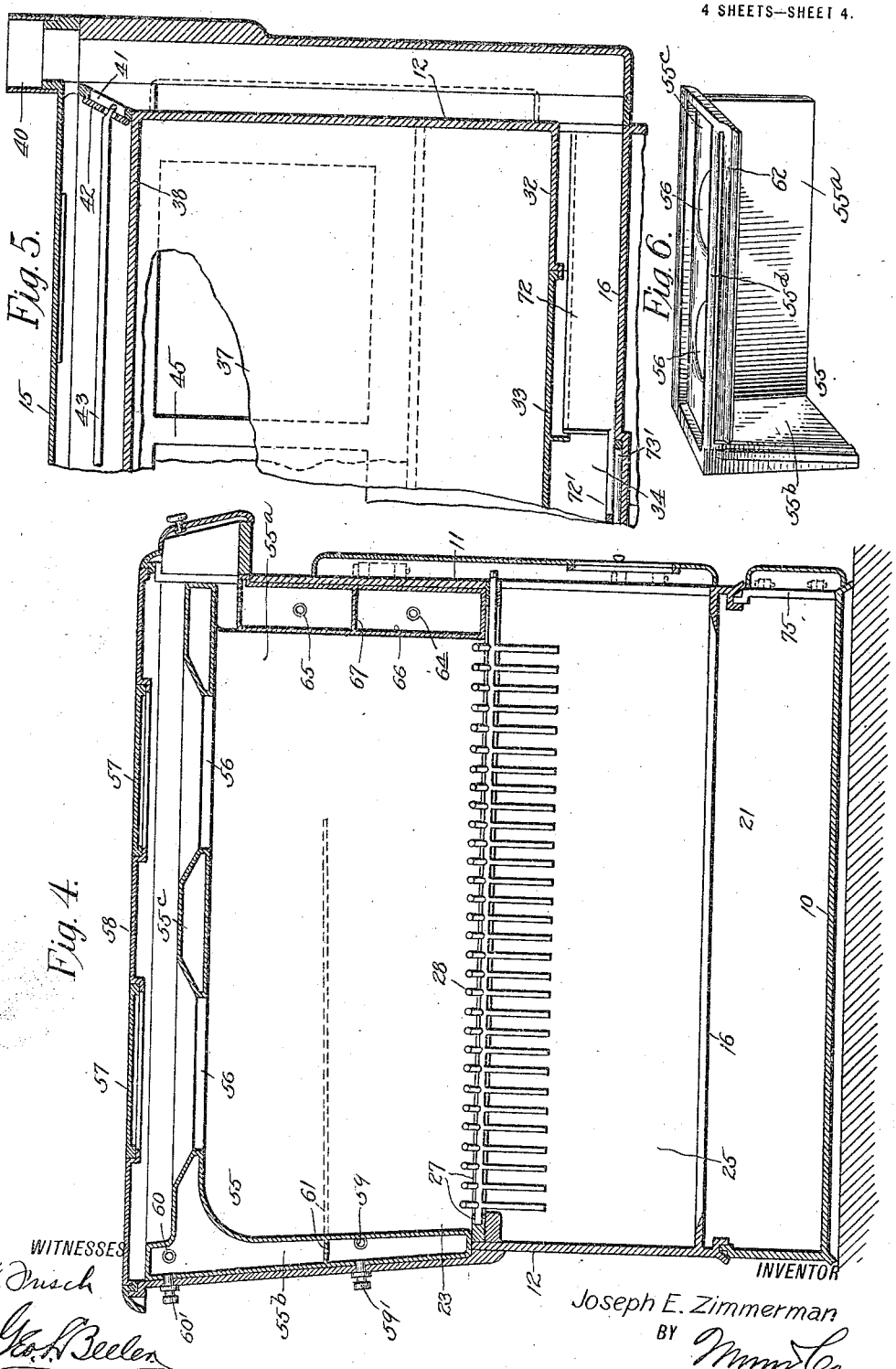

UNITED STATES PATENT OFFICE.

JOSEPH EDWARD ZIMMERMAN, OF NEW YORK, N. Y., ASSIGNOR OF ONE-HALF TO JOHN ZIMMERMAN, OF GLENDALE, NEW YORK.

COMBINATION COOKING AND HOUSE WATER-HEATING RANGE.

1,294,217.

Specification of Letters Patent.   Patented Feb. 11, 1919.

Application filed August 29, 1918.   Serial No. 251,952.

*To all whom it may concern:*

Be it known that I, JOSEPH EDWARD ZIMMERMAN, a citizen of the United States, and a resident of the city of New York, Richmond Hill, borough of Queens, in the county of Queens and State of New York, have invented a new and Improved Combination Cooking and House Water-Heating Range, of which the following is a full, clear, and exact description.

This invention relates to stoves or ranges, and has particular reference to ranges designed particularly for house or domestic purposes.

Among the objects of the invention is to provide a stove or range having a plurality of independent and interchangeable fire boxes or heating units, one of which is to be employed in cold weather and the other of which is to be employed in summer weather, an oven being provided and so disposed as to be capable of being heated from either fire box or source of heat.

Another object of the invention is to provide a cooking range having specially designed water-heating means connected therewith for the purpose of providing a hot-water circulating heating system for the building in which the range is located.

A further object of the invention is the provision of a cooking range or the like having a fire box at each end, a baking oven between the two fire boxes, over and around which the heat from either fire box may be directed, and a single chimney connection with draft regulators whereby such connection may be brought into communication with either fire box.

A still further object of the invention is to improve the structural details of a cooking range, adapting it for improved design of water back for house-heating purposes, and also providing special facilities for easy interchange or renewal of any parts that are likely to deteriorate after a reasonable amount of use.

The foregoing and other objects of invention are attained by the means substantially as hereinafter more particularly described, as illustrated in the accompanying drawings, and defined by the claims. In the drawings the similar parts will be referred to in the different views by like reference characters, and of the drawings—

Figs. 4 and 5 are vertical transverse sections on the corresponding lines of Fig. 1.

Fig. 6 is a detailed perspective view of the improved water back for house-heating purposes.

Figure 1:
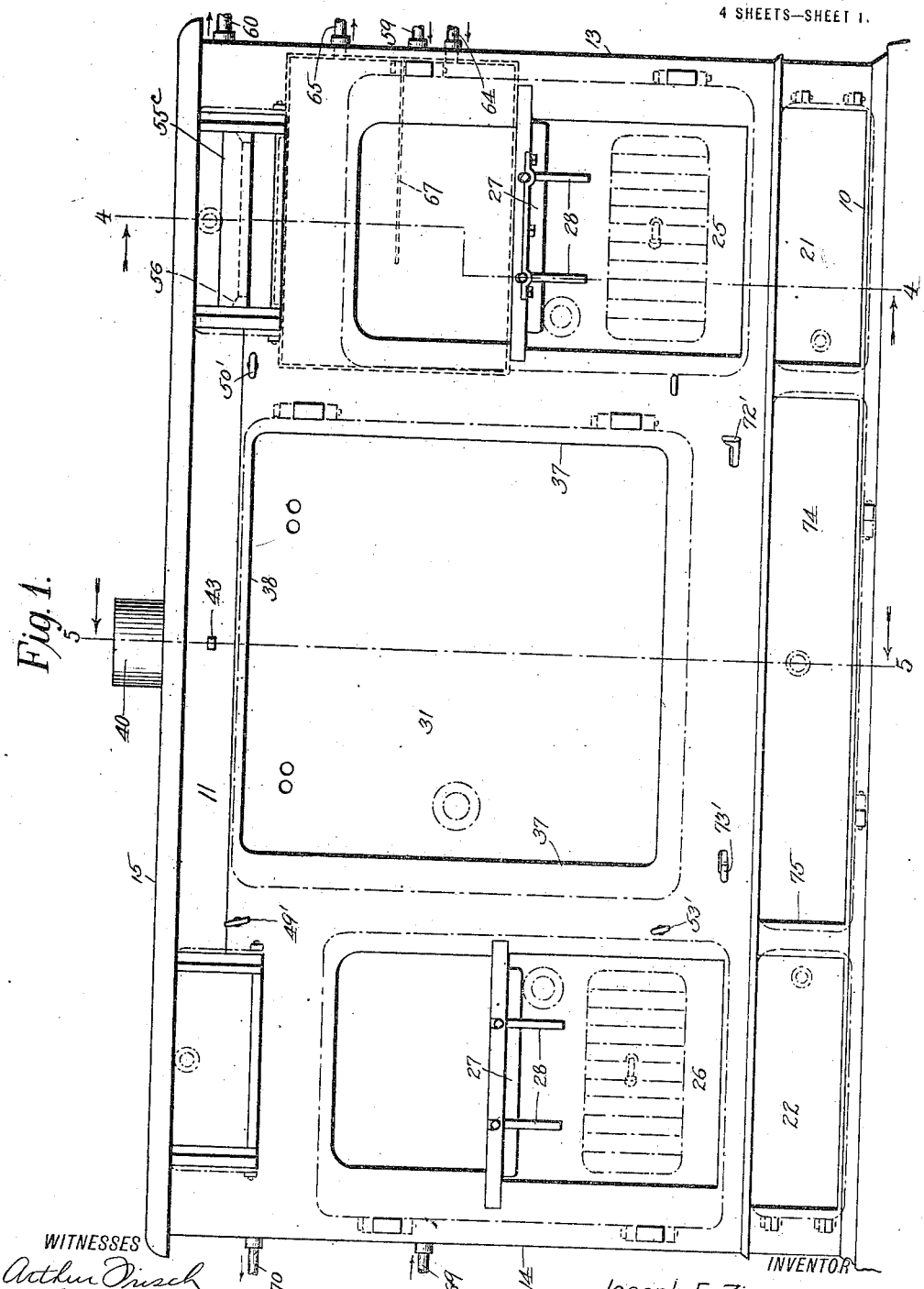
Figure 1 is a front elevation of a preferred embodiment of the invention.
Figure 2:
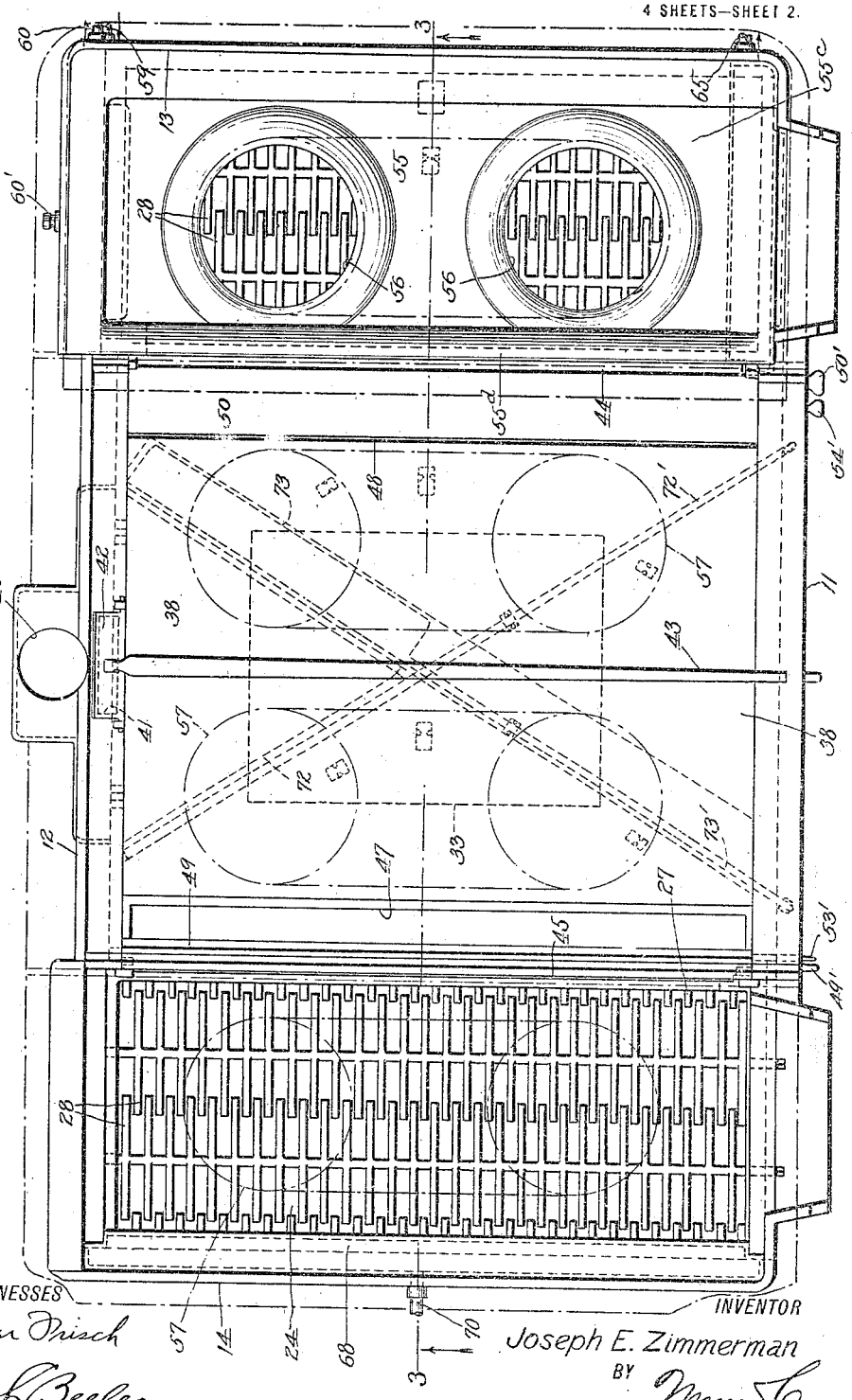
Fig. 2 is a plan view with portions of the top omitted.

In the practice of this invention it will be understood that the various parts may be made of any suitable or approved materials, and that the relative sizes and proportions, as well as the general design or assemblage of the parts, may be varied to a considerable extent without departing from the spirit of the invention or sacrificing any of its advantages.

Referring now more specifically to the drawings, I show a range comprising a base 10, front and rear walls 11 and 12, right and left end walls 13 and 14, and a top 15. Above the base 10 is arranged a false bottom 16 substantially coextensive with the base, and between the end walls are vertical transverse partitions 17 and 18 which coöperate with the several end walls, determining the width of the fire boxes. In vertical alinement with the partitions are shallow partitions 19 and 20 whereby the boundaries of ash pits 21 and 22 are determined below the respective fire boxes. Vertically beneath the fire boxes proper 23 and 24 are air spaces 25 and 26 respectively, the vertical extent of which may be greater or less depending upon the volume of the fire boxes or the character of fuel to be used therein. Any suitable grates 27 and shaking devices 28 may be employed in each fire box, each grate however is shown as being removably supported upon horizontal ledges 29 and 30 formed or supported on the end walls and transverse partitions.

The baking oven is indicated as arranged centrally of the structure at 31, the bottom 32 of which, having a removable panel or lid 33 for access to the space below, is spaced above the false bottom 16, providing a horizontal draft space 34 which extends all the way from one partition 17 to the other partition 18 and substantially the full depth of the range from front to rear. At the sides of the oven are two relatively narrow spaces 35 and 36 for down drafts to be used in alternation, as will be more fully set forth below. These spaces are bounded in width by the respective transverse partitions and the side walls 37 of the baking oven. Between the top 38 of the oven and the top 15 of the range is an upper horizontal draft space 39. The smoke flue 40 is indicated as substantially central of the back portion of the range and communicates with the draft space 34 near the bottom of the range and with the upper draft space 39 through a port 41, the same being controlled, however, by a direct draft or pipe damper 42 hinged along its lower edge and adapted to swing forward and downward when a rod 43 is pulled at the front of the structure.

Removably supported upon the ledges 30 of both partitions 17 and 18 are fire bricks 44 and 45 of any suitable design or construction. These bricks are held in place by flanges 46, forming guideways, in addition to said ledges, any heat passing through the bricks acting to heat the spaces 35 and 36 and then the oven.

The upper ends of the down draft spaces 35 and 36 communicate through ports 47 and 48 with the ends of the upper draft space 39. These ports, however, are adapted to be closed by pivoted dampers 49 and 50 respectively which are manipulated from the front through finger-pieces 49' and 50' respectively. Likewise I provide at the lower edges of the spaces 35 and 36 ports 51 and 52 for communication with the lower draft space 34, these ports being controlled by dampers 53 and 54 through finger-pieces 53' and 54'.

55 indicates as a whole a peculiar and novel structure of water back employed in connection with the fire box 23 and comprising front, rear, and top wings 55a, 55b, and 55c respectively, all in communication interiorly with one another. This water back, therefore, substantially bounds three of the six surrounding faces or walls of the fire box 23. While I have indicated this water back 55 located at the right end of the range and adjacent to the fire box 23, it is obvious that in the assemblage or construction of the range such water back suitably altered and designed might be arranged at the left end of the range.

The upper wall or wing 55c of the water back is provided with front and rear heat openings 56 in alinement with movable plates 57 constituting a portion of the removable top panel 58. The panel 58 is long and wide enough to entirely cover the water back 55, hence with the removal of this panel 58 direct access may be had to the water back for any purpose. As above premised, this water back is intended for heating the water in a circulating hot-water system for dwelling houses. To this end, therefore, the water back is provided with any suitably arranged couplings, such as 59 and 60, for the admission and delivery of water respectively through the end wall 13. If it is more convenient, however, to establish communication with the back wing 55b, the same may be accomplished through couplings 59' and 60', shown, however, in this instance as capped. In either event, the admission of the water is to the lower portion of the water back below a deflector 61 whereby the admitted water is caused to flow along a suitable portion of the bottom of the water back before it is delivered from the same, thus bringing the water into direct communication with practically all of the exposed surfaces of all three wings. The deflector 61 is indicated as extending entirely across the rear wing 55b and well forward along the central portion of the side wing 55a.

Figure 3:
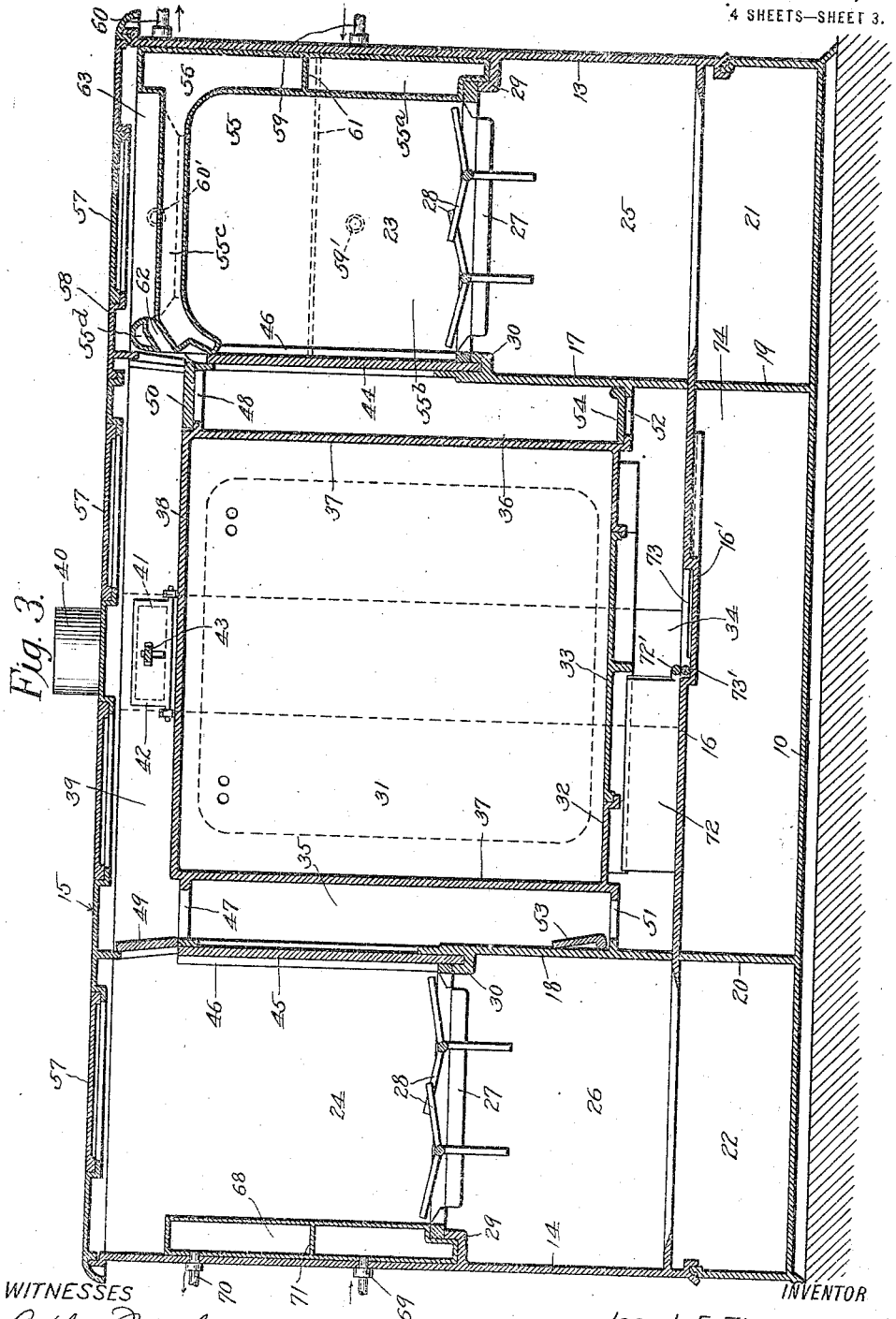
Fig. 3 is a vertical longitudinal section on the line 3—3 of Fig. 2.

As indicated in Figs. 3 and 6, there is provided at 55d a tubular extension or coil forming a very efficient water heater having communication at its ends with the water space in the uppermost wing 55c, and between which and the main portion of the wing 55c is a draft space 62 through which the products of combustion after passing through the openings 56 are delivered in a thin sheet from the heating chamber 63 over into the draft space 39, assuming that the damper 50 is in the position indicated in Fig. 3.

From what has been stated above it will be understood that the water back 55 may be inspected or even removed at any time and for any purpose, such as repair or substitution, by simply uncoupling the pipes at the joints 59 and 60 and removing the top panel 58 at the top of the stove. The fire bricks 44 likewise may be removed or replaced whenever required independent of the water back.

64 and 65 indicate inlet and outlet connections for the water back 66 at the front of the fire box 23, the same having a central deflector 67 to insure complete circulation of the water. This water back is connected to the kitchen boiler (not shown) and, hence, is intended for heating the water used for cooking or other household purposes, as distinguished from the house-heating system. Any suitable front or pipe damper provisions may be provided for controlling the extent of heat or rapidity of combustion of the fuel. With such draft devices I am not directly concerned.

In connection with the fire box 24 at the other end of the range, I provide a water back 68 having inlet and outlet connections 69 and 70 for the kitchen boiler. An intermediate deflector 71 is provided for circulation purposes. This kitchen-boiler water back is preferably located along the wall of the range that is most exposed and hence will afford the maximum protection to the kitchen from the heat. All the water backs are supported upon ledges 29. The fire back 23 with its accessories is intended for winter use or whenever the weather demands the heating of the building through the circulation of the water from the water back 55, consequently the fire box 24 is designed for independent use at any time when the house heating system is not to be brought into use. For cooking purposes, however, both fire boxes may be operated if the maximum pot service of the range is required. For ordinary household purposes, however, a single fire box is sufficient.

In the draft space 34, and supported preferably upon the false bottom 16, are two draft regulators 72 and 73 the axes of which are horizontal and substantially intersect each other at the center of the structure. These draft regulators are provided with handles or rods 72' and 73' which extend through to the front of the range. The damper 73 lies or operates in a depression 16' of the false bottom so that the two operating rods do not interfere with each other.

From the foregoing description of the mechanism the operation of my improvement may be briefly summarized as follows: Assuming that the parts are adjusted as indicated in Fig. 3, with fire burning in the fire box 23, the course of the products of combustion will be upward through the heating holes 56, thence laterally from the heating space 63 through the passageway 62, draft space 39, thence downward through the port space 47, draft space 35, and into the horizontal draft space through the port 51. The damper 72 being elevated acts as a deflector, causing the direction of the draft to be along the draft space 34 toward the right side of the same to the oven, thereby heating the whole of the bottom of the oven before reaching the flue. The damper 42 in this operation is closed. The damper 50, while open with respect to the direct draft from the fire box 23, closes communication with the draft space 36. In this operation the damper 73 is open or is lying within the depression 16' of the false bottom. Under the conditions just enumerated the heat from the fire box 23 is being utilized to heat the water for the house-heating system through the water back 55, and the kitchen boiler through the water back 66, and is also available for cooking on any part of the top of the range above the active fire box or oven, and also for baking or roasting in the oven.

In milder weather, or when the house is not to be heated, the fire box 24 is used; in which event, the positions of the dampers 49, 50, 53, 54, 72, and 73 are all reversed from the positions indicated in Fig. 3, assuming, of course, that the oven is to be used for baking. Fire then in the fire box 24 will be directly available for cooking on the central portion or left end of the top and for heating the water in the kitchen boiler through the water back 68. If cooking is to be performed only on the top of the stove from either fire box while the water in the water back or backs is being heated, the dampers 49 and 50 will both be closed to their horizontal positions and the damper 42 will be opened, thus a direct draft will be had from either fire box along the adjacent portion of the draft space 39 to and through the port 41 into the flue. The rapidity of combustion in such event obviously will be controlled by any usual front or flue dampers.

The space 74 between the base 10 and the false bottom 16 and between the vertical partitions 19 and 20 may be utilized as a warming oven, access being had thereto through any suitable front panel 75.

I claim:

1. In a cooking range, the combination with a baking oven, of two fire boxes arranged on opposite sides of the baking oven, and means to cause the products of combustion from either fire box to flow over the oven toward the other fire box and thence downward along the remote side of the oven and along the whole of the bottom of the oven toward the source of heat, said means including a pair of draft regulators below the oven and adapted to oscillate around axes substantially intersecting each other diagonally of the oven bottom.

2. In a heating apparatus of the character set forth, the combination with a baking oven having draft spaces along the top, bottom, and sides thereof, and a smoke flue leading from the bottom draft space, of two fire boxes arranged on opposite sides of the oven and adjacent to the respective vertical side draft spaces, and draft controlling means movable from the front of the structure to cause the products of combustion from either fire box to pass directly therefrom along the upper draft space over the oven, thence downward through the remote side space, and thence horizontally in the opposite direction along the lower draft space to the smoke flue, said controlling means comprising tiltable draft regulators extending toward the center of the bottom draft space from the rear corners thereof, a depression being formed to receive one of the regulators below the axis of the other.

3. The combination with a chamber to be heated, there being provided a draft space beneath said chamber, of a pair of independent fire boxes arranged on opposite sides of said chamber, and means to cause the products of combustion from either fire box to pass across the top of the chamber and thence downward to and along the aforesaid space, said controlling means including a pair of deflectors journaled for rotation around horizontal axes arranged at an angle to each other in said bottom space, the products of combustion being caused to pass along the closed one of said deflectors and thence over the open one thereof.

4. In a house heating cooking range, the combination with a fire box structure and a baking oven adjacent thereto, said fire box structure including a fire brick of single thickness constituting the inner vertical wall of the fire box adjacent to the chamber leading toward the oven, of a water back comprising three substantially rectangular wings each connected along two edges to the other two wings, one of the wings constituting the front wall of the fire box, another constituting the rear end wall thereof, and the last constituting the top wall of the fire box and having vertical fuel holes therethrough, the top of the range lying close over said last mentioned wing, and said water back including also a straight tubular member lying close and parallel over the inner edge of the last mentioned wing and having circulating communication with said end wall wing, said tubular member being so spaced from the said inner edge of the third mentioned wing as to cause the currents of combustion to pass beneath it in a thin sheet after flowing upward through said fuel holes toward the oven space.

5. In a house heating and cooking range, the combination with a fire box structure, an oven space closely adjacent to the inner wall thereof and a removable vertical fire brick constituting said wall, of a water back removably located in the fire box structure and comprising a plurality of substantially rectangular wings having circulating communication with one another, each wing having connection with the other wings along a plurality of straight edges, one of the wings constituting the front wall of the fire box and another of the wings constituting the top of the fire box and having a plurality of vertical fuel holes therethrough and through which the products of combustion pass upward from the fire box, said water back including also a straight tubular member arranged close over and parallel to the inner edge of the latter mentioned wing and through which the water in the water back is free to circulate, and a removable top range plate larger than the water back adapting said water back to be removed as a whole, said plate having means coöperating closely with the tubular member aforesaid to cause the products of combustion to flow between said tubular member and the adjacent wing in a thin sheet toward the oven space.

JOSEPH EDWARD ZIMMERMAN.

Copies of this patent may be obtained for five cents each, by addressing the "Commissioner of Patents, Washington, D. C."